(12) United States Patent
Sugeno et al.

(10) Patent No.: US 7,914,924 B2
(45) Date of Patent: Mar. 29, 2011

(54) STACKED BATTERY PACK HOUSING

(75) Inventors: Kazuya Sugeno, Fukushima (JP);
Toshio Takeshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1051 days.

(21) Appl. No.: 11/020,097

(22) Filed: Dec. 27, 2004

(65) Prior Publication Data

US 2005/0202315 A1 Sep. 15, 2005

(30) Foreign Application Priority Data

Jan. 15, 2004 (JP) ................. P2004-007470

(51) Int. Cl.
*H01M 2/24* (2006.01)
*H01M 2/02* (2006.01)
*H01M 2/12* (2006.01)

(52) U.S. Cl. ........... 429/159; 429/156; 429/120; 429/82

(58) Field of Classification Search .................... 429/82, 429/120, 99, 156, 159
See application file for complete search history.

(56) References Cited

U.S. PATENT DOCUMENTS 7,045,236 B1 * 5/2006 Andrew et al. ............. 429/26
2003/0027037 A1 * 2/2003 Moores et al. ............. 429/82

FOREIGN PATENT DOCUMENTS

| JP | 11-45689 | | 2/1999 |
| JP | 2002100411 A | * | 4/2002 |
| JP | 2003-086155 | * | 3/2003 |
| JP | 2003-86155 | | 3/2003 |

OTHER PUBLICATIONS

Takeshita Toshio, machine translation of JP 2003-086155, Mar. 2003.*
U.S. Appl. No. 12/845,443, filed Jul. 28, 2010, Takahashi, et al.
U.S. Appl. No. 12/845,437, filed Jul. 28, 2010, Takahashi, et al.

* cited by examiner

*Primary Examiner* — Dah-Wei D Yuan
*Assistant Examiner* — Edu E Enin-Okut
(74) *Attorney, Agent, or Firm* — Oblon, Spivak, McClelland, Maier & Neustadt, L.L.P.

(57) ABSTRACT

A battery pack is provided, which can be assembled easily and has a high reliability. In a case of the battery pack 1 constituted by an upper case 3 and a lower case 4, a plurality of box-shaped cells 5 and a partition member 2 are housed. The partition member 2 supports the cells in stacked manner as being spaced from each other, and has an insulating member for insulating between a cell 5*b* and a cell 5*c*, which are electrically connected in parallel. The partition member is further provided with the cells 5, a positive electrode 6, a negative electrode 7, an intermediate tub 8, and a guide for aligning the upper case 3 and the lower case 4.

11 Claims, 3 Drawing Sheets

STACKED BATTERY PACK HOUSING

CROSS REFERENCES TO RELATED APPLICATIONS

The present document is based on Japanese Priority Document JP 2004-007470, filed in the Japanese Patent Office on Jan. 15, 2004, the entire contents of which being incorporated herein by reference.

BACKGROUND OF THE INVENTION

1. Filed of the Invention

The present invention relates to a battery pack, and in particular to a battery pack having, housed therein, a plurality of cells, individually configured by housing an electrode stack and an electrolyte in a box-shaped housing, in a stacked manner.

2. Description of Related Art

In recent trends in downsizing of electronic devices, various batteries used for the electronic devices are also becoming small, having a variety of shapes. Among others, box-shaped lithium ion battery is widely used to mobile phones, notebook-type personal computers and so forth because it can be raised in the energy density.

Battery capacity and voltage adaptive to a wide range of electronic devices can be obtained by stacking a plurality of box-shaped lithium ion batteries in a battery pack. Parallel connection of thus-stacked plurality of batteries also makes it possible to raise battery capacity of the battery pack. Connecting thus-stacked plurality of batteries in series can further raise output voltage of the battery pack.

In this sort of battery pack, insulation between the cells thus arranged in the stacked manner has been accomplished using a partition member such as tape. For example, the insulation between the adjacent batteries has been secured by a gap provided by adhering a tape around the outer peripheral portion of the box-shaped battery housing.

The box-shaped battery is, however, smaller in strength of the battery housing as compared with that of the cylindrical battery, so that the box-shaped battery, such as lithium ion battery, having a large energy density raises a drawback in that the battery housing expands with increase in the inner pressure of the battery, and thereby degrades the durability and reliability.

To address the drawback, Patent Document 1 below discloses a packaged battery device in which the batteries are supported by a spacer having a side plate expansion absorbing space (Patent Document 1: Japanese Patent Application Publication No. 2519576).

Because the side plate expansion absorbing space is given by the spacer between the battery housings of the stacked batteries, the packaged battery devices makes it possible to absorb the expanded portion into the side plate expansion absorbing space even if the side plates of the box-shaped battery housing cause a barrel-shape expansion.

SUMMARY OF THE INVENTION

The above-described conventional battery pack, however, has suffered from a drawback below. That is, the conventional stacked-type battery pack uses a tape, spacer or the like as a partition member for insulation, and this undesirably makes the configuration complicated, and makes the assembly difficult.

Another drawback is that the partition member disposed between the batteries is mainly intended for providing a gap between the batteries or guiding the batteries, so that assembly strength of the battery pack after being loaded with the batteries depends on strength of the individual components such as the tape and spacer. Still another drawback is that the conventional battery pack is not configured so as to support the whole assembly of the battery, and this result in only a poor structural strength.

Still another drawback is that the conventional partition member has no guide member aligning the battery, substrate and terminals, so that the positional accuracy must necessarily be adjusted by some facility.

The present invention therefore provides a battery pack, which can be assembled easily and has a high reliability.

One aspect of the invention is to provide a battery pack having a plurality of box-shaped cells housed in a case, including a partition member supporting the plurality of box-shaped cells in a stacked manner as being spaced from each other, wherein an insulating member is at least provided on the partition member, for insulating between cells electrically connected in parallel.

In this invention, the cells can precisely, rigidly, and stably be supported while being insulated from each other, only by using the partition member supporting the plurality of box-shaped cells in a stacked manner as being spaced from each other. The assembly of the battery pack is easy. Because the insulating member insulating between the cells connected in parallel is at least provided to the partition member, it is also made possible to more reliably insulate the cells having different potentials. Therefore, according to the present invention, it is made possible to desirably work out wirings among the cells disposed therein, and to provide a highly-reliable battery pack favorable in the strength and in the positional accuracy of the internal components.

If the partition member is configured as supporting the cells on their peripheral portions, and as being provided with an opening in the center portion of its contact surface with the cells, or as being thinned at the center portion of its contact surface with the cells, the cells can be released from pressurization even when the cells expand. This makes it possible to further improve the reliability.

Provision of an alignment mechanism for the cells to the partition member makes it possible to further facilitate the assembly, and to improve the positional accuracy of the cells. Provision of an alignment mechanism for tabs, used for electrical connection of the cell, to the partition member makes it possible to further facilitate the assembly, and to improve positional accuracy of the tabs. Provision of an alignment mechanism for a circuit board, having a protective circuit mounted thereon, to the partition member makes it possible to further facilitate the assembly, and to improve positional accuracy of the circuit board. Provision of an alignment mechanism for a case to the partition member, so as to make the partition member support the inner side of the case, makes it possible to further facilitate the assembly, and to improve the strength.

DESCRIPTION OF THE EMBODIMENT(S)

Figure 1:
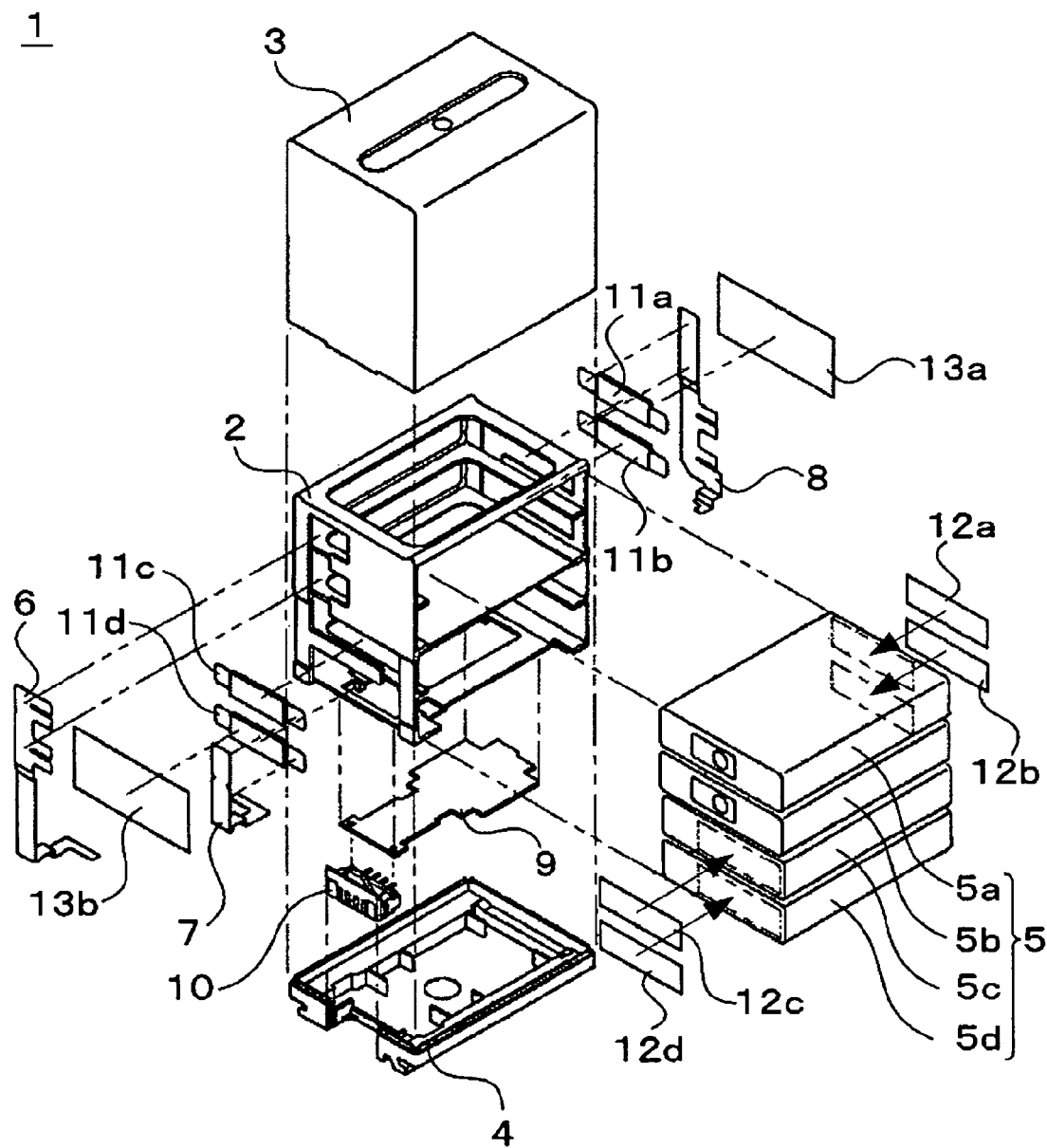
FIG. 1 is a schematic diagram of an exemplary configuration of the battery pack according to one embodiment of the present invention.

The following paragraphs will describe embodiments of the present invention referring to the attached drawings. FIG. 1 shows an exemplary configuration of a battery pack according to one embodiment of the present invention. Reference numeral 1 denotes a battery pack used as a power source for driving electronic devices such as video camera. It is to be noted that FIG. 1 is an exploded view of the battery pack 1, wherein the individual components are combined in the direction, indicated by the two-dot chain lines.

The battery pack 1 is configured so that a partition member 2 is housed in a case composed of an upper case 3 and a lower case 4. The upper case 3 is a component constituting the upper portion of the case, and the lower case 4 is a component constituting the lower portion of the case. The upper case 3 and the lower case 4 are bonded by welding or with an adhesive so as to make the inner portion of the case tightly sealed. The partition member 2 is configured so as to support a plurality of cells 5 (four cells 5a to 5d shown in the drawing) as being spaced from each other.

The upper case 3, lower case 4 and partition member 2 are made of a relatively tough material such as plastic. The uppercase 3, lowercase 4 and partition member 2 are preferably made of a material having a light-weight and insulating property. Selection of a light-weight material makes it possible to improve portability of the battery pack and an electronic device using the battery pack 1. Selection of an insulating material makes it possible to avoid electrical connection failure ascribable to the battery pack 1, such as short-circuiting with the individual components constituting the battery pack 1 or with electronic devices. The partition member 2 will be detailed later.

Cells 5 are box-shaped lithium ion secondary batteries. More specifically, each of the cells 5 is a unit cell configured so that an electrode stack, having a positive electrode and a negative electrode stacked therein while placing a separator in between, and an electrolyte are housed in a box-shaped housing. Each of the cells 5 has a positive electrode pin as a plus terminal. The box-shaped housing of each of the cells 5 is made of an electro-conductive material such as iron, iron alloy, aluminum (Al) and aluminum alloy, and serves as an anode can electrically connected to the negative electrode.

Cells 5a to 5d are fixed as being individually inserted and engaged to drawer-like spaces provided to the partition member 2. The cell 5a and cell 5b are inserted and engaged to the partition member 2 in the direction allowing the left hand sides thereof to serve as plus electrodes and the right hand sides thereof to serve as minus electrodes. The cells 5c and cell 5d are inserted and engaged to the partition member 2 in the direction allowing the left hand sides thereof to serve as minus electrodes and the right hand sides thereof to serve as plus electrodes. This facilitates the electrical connection among the cells 5 described below.

Parallel connection of the cells 5 in the battery pack 1 makes it possible to raise the battery capacity, and series connection makes it possible to raise the output voltage. In the battery pack 1, the cell 5a and cell 5b fixed to the partition member 2 are electrically connected in parallel, and the cell 5c and cell 5d fixed to the partition member 2 are electrically connected in parallel. The cells 5a and 5b, and the cells 5c and 5d are connected in series.

Electrical connection among the cells 5 are accomplished through a positive electrode tab 6, a negative electrode tab 7 and an intermediate tab 8. The positive electrode tab 6, negative electrode tab 7 and intermediate tab 8 are electro-conductive members such as made of metal or the like. The positive electrode tab 6 is provided for electrical connection between the plus electrode of the cell 5a and the plus electrode of the cell 5b, the negative electrode tab is provided for electrical connection between the minus electrode of the cell 5c and the minus electrode of the cell 5d, and the intermediate tab 8 is provided for electrical connection between the minus electrode of the cell 5a and the plus electrode of the cell 5d.

The minus electrodes of the cells 5a to 5d are provided with protective elements 11a to 11d, respectively, and electrical connection on the minus electrode side of the individual cells is established respectively through these protective elements 11a to 11d. Electrical connection among these cells 5a to 5d, positive electrode tab 6, negative electrode tab 7 and intermediate tab 8, and protective elements 11a to 11d is established through welding such as soldering, or through bonding using an adhesive.

The protective element 11a to 11d are elements capable of disconnecting the electrical connection upon detection of abnormality such as positive thermistor (PTC: Positive Temperature Coefficient), temperature fuse and thermostat.

The positive thermistor (PTC) is composed of a mixture of a conductor such as graphite and metal powder, and a resin, and increases the resistivity value under heating at high temperatures due to expansion of the resin and concomitant lowering in the bonding density of the conductor.

The temperature fuse is made of a low-melting-point metal rod, wherein the low-melting-point metal melts down under heating at high temperatures. The low-melting-point metal has a flux adhered on the peripheral portion thereof.

The thermostat is configured by a bimetal having two species of metals bonded with each other, and a metal plate having a spring property, wherein a switch contact point is provided to each of the bimetal and the metal plate. Either one of the bimetal and the metal plate can move upward and downward, and the other is fixed. Some types of the thermostat have a switch contact point only on either one of the bimetal and the metal plate. Normally the switch contact point provided on the bimetal and the switch contact point provided on the metal plate are kept in a contact state, and upon heated to reach a predetermined temperature, the bimetal moves so as to warp in the opposite direction to thereby open the switch contact. The contact state of the individual switch points of the bimetal and metal plate is recovered when the temperature returns to the normal state again.

Seals 12a to 12d are typically made of an insulating tape having adhesiveness on one surface thereof, and are attached on the cells 5 for insulation. The seal 12a is a member insulating between the cell 5a and the side of the protective element 11a connected to the intermediate tab 8, and the seal 12b is a member insulating between the cell 5b and the side of the protective element 11b connected to the intermediate tab 8. The seal 12c is a member insulating between the cell 5c and the side of the protective element 11c connected to the negative electrode tab 7, and the seal 12d is a member insulating between the cell 5d and the side of the protective element 11d connected to the negative electrode tab 7.

An insulating plate 13a is a member having an insulating property and protecting the protective element 11a and 11b from the external, and is provided on the outer surfaces of the protective element 11a and 11b so as to prevent the connection between the protective elements 11a, 11b and the cells 5a, 5b from short-circuiting with other members or connected portions. The insulating plate 13b is a member having an insulating property and protecting the protective element 11c and 11d from the external, and is provided on the outer surfaces of the protective element 11c and 11d so as to prevent the connection between the protective elements 11c, 11d and the cells 5c, 5d from short-circuiting with other members or connected portions.

A circuit board 9 is a printed circuit board constituting a protective circuit having functions of ensuring safe charging and discharging of the battery pack 1, such as for over-charging protection, over-discharging protection and over-current protection. A terminal member 10 is a member constituting the plus terminal and minus terminal of the battery pack 1 connected to an electronic device or to a charger. A positive electrode tab 6 and a negative electrode tab 7 are electrically connected respectively through electric circuits on the circuit board 9 to the plus terminal and minus terminal of the terminal member 10. Electrical connection of each of the positive electrode tab 6 and the negative electrode tab 7 with the circuit board 9, and electrical connection of each of the plus terminal and minus terminal of the terminal member 10 with the circuit board 9 are established typically by soldering.

The circuit board 9 and terminal member 10 are fixed to the partition member 2 typically by screw tightening. The partition member 2 is provided with alignment mechanisms for the circuit board 9 and terminal member 10 provided thereto. For example, provision of a protruded portion to the partition member 2, and engagement therewith of a recessed portion given on the circuit board 9 or terminal member 10 enables alignment of the circuit board 9.

The partition member 2 has, provided thereto, an alignment mechanism for the lower case 4. More specifically, the bottom portion inside the lower case 4 has an irregular form allowing engagement with the bottom portion of the partition member 2 combined with the circuit board 9 and terminal member 10, so as to allow the partition member 2, circuit board 9 and terminal member 10 to be engaged with the lower case 4 in a stable manner. It is also allowable to fix the partition member 2 and lower case 4 typically by screw tightening. The terminal member 10 is fixed so as to expose the terminal portion thereof on the outer surface of the battery pack 1. The terminal member 10 and lower case 4 are tightly sealed typically by welding or bonding with an adhesive, to avoid having any gap in between.

Figure 2:
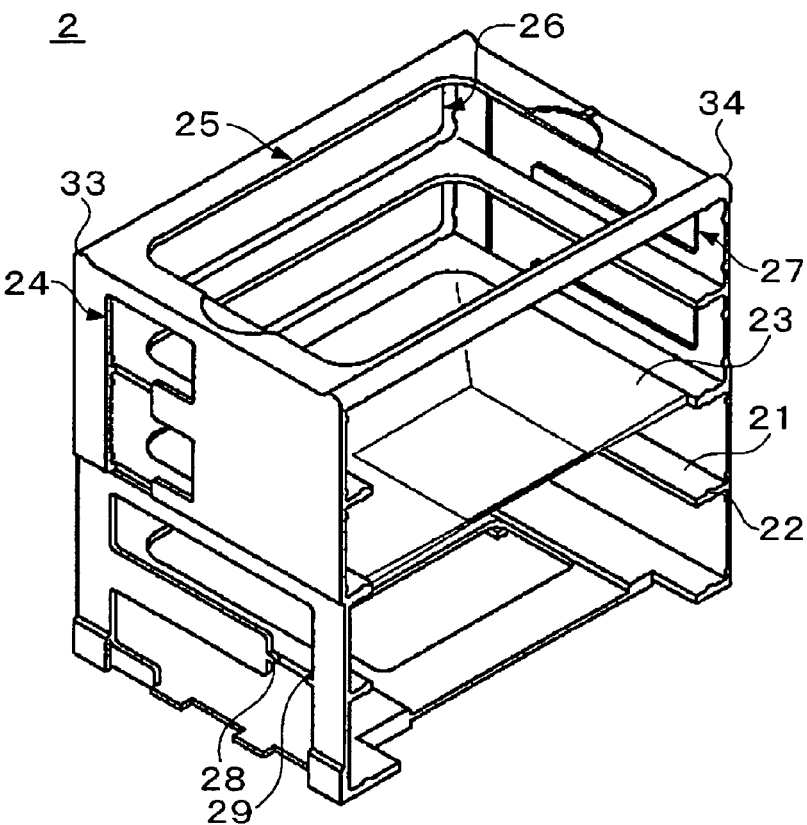
FIG. 2 is an enlarged schematic diagram of a partition member.
Figure 3:
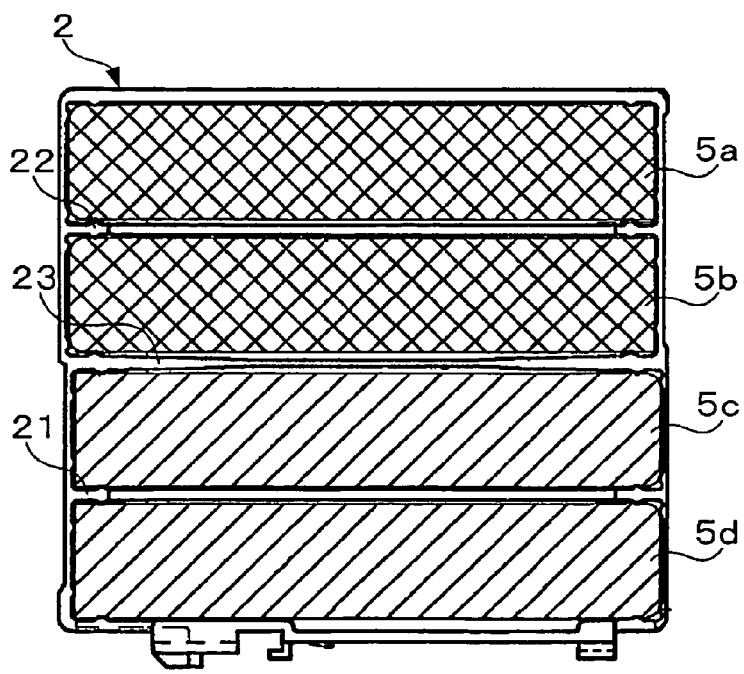
FIG. 3 is a schematic sectional view of a part it ion member housing cells.

FIG. 2 is an enlarged view of the partition member 2, and FIG. 3 is a sectional view of the partition member 2 having the cells 5 fixed therein, taken along the direction orthogonal to the direction of insertion of the cells 5. The partition member 2 is configured as having a box form so as to house the cells 5a to 5d in a stacked manner. One side face of the partition member 2 is configured as having no side wall, so as to allow insertion of the cells 5. It is also allowable, although not shown, to provide a side wall similar to any other side wall, so as to place a lid after insertion of the cells 5. This further improves stability of the cells 5.

The partition member 2 has, on the inner side wall thereof, a protruded portion 21 corresponding to thickness of the cells 5, so as to allow insertion of the cells 5, wherein the cells 5 are inserted and engaged along the protruded geometry 21 by pushing them just like drawer boxes. The protruded geometry 21 can keep the cells 5 as being spaced by a predetermined gap. The partition member 2 is configured so as to support the cells 5, inserted along the inner surface and protruded portion 21, at the peripheral portion of the cells 5. The protruded portion 21 provided herein over the entire inner circumference of the partition member 2, may also partially be provided. The partial provision contributes to weight reduction. The protruded portion 21 is typically formed with the partition member 2 by integral molding, and this makes it possible to improve the strength thereof in a state having the cells 5 housed therein.

Projections 22 are protrusions holding the cells 5 in between. The projections 22 are typically provided, for the convenience of smooth insertion and withdrawal of the cells 5, on the bottom inner wall and ceiling inner wall of the partition member 2, and on the upper and lower portions of the protruded portion 21. Form of the projections 22 are not limited to those shown in FIG. 2 and FIG. 3 provided that the cells 5 can be stably held in between. For example, it is also allowable to provide the projections at the upper and lower four-corners of the cells 5. With the aid of the projections 22, the cells 5 can be fixed to the partition member 2 in a gapless and stable manner.

There is provided an insulating member 23 between the cell 5b and cell 5c electrically connected in parallel. The insulating member 23 is made of a material having an insulating property. This makes it possible to completely insulate between different potentials of cells 5 stacked in the partition member 2. That is, it is made possible to avoid short-circuiting between the cells 5. Provision of the insulating member 23 also makes it possible to increase strength of the partition member 2. It is also allowable to dispose the insulating member 23 between other cells 5, such as between every adjacent cells 5. This makes it possible to reliably insulate the cells 5 disposed on both sides of the insulating member 23. The insulating member 23, provided on the inner side of the protruded portion 21 as shown in FIG. 2 and FIG. 3, may also be configured by the protruded portion 21 per se. This allows integral molding with the partition member 2, and can further increase the strength.

Incidentally, the high-energy-density box-shaped battery such as lithium battery, is causative of expansion of the side faces of the battery housing due to increase in inner pressure of the battery. The partition member 2 has a structure capable of releasing pressurization due to the expansion.

The plurality of cells 5 inserted in the partition member 2 are spaced by the thickness of the protruded portion 21. The gap can successfully protect the individual members from pressurization induced by the expansion, even if the cells 5 expand. Therefore, the thickness of the protruded portion 21 is appropriately designed depending on a possible degree of expansion of the cells 5.

The partition member 2 is also provided with openings for releasing the pressurization, on the surface brought into contact with side faces of the cells 5, so as to avoid pressurization due to expansion of the cells 5. For example, an opening 24, an opening 25, an opening 26 and an opening 27 are provided at the portions fixing the cell 5a. It is to be noted that this side of FIG. 2 is opened as an insertion slot and has no side walls, so that the partition member 2 is not pressurized by expansion of the cells 5. It is also to be noted that the lower side is spaced from the cell 5b by a gap secured by the protruded portion 21, so that the partition member 2 is not pressurized by expansion of the cells 5. Similarly to the case for the cell 5a, there are also provided openings for releasing the pressurization, on the surface brought into contact with side faces of the cells 5b to 5d. Release of pressurization caused by expansion of the cells 5 through the openings makes it possible also to obtain heat radiation effect. It is also allowable to place lids from the outside over the all of, or a part of the openings of the partition member 2, so far as the thickness of the side wall of the partition member 2 can absorb the expansion of the cells 5.

A structure of avoiding the pressurization through the openings cannot be adopted between the cell 5b and cell 5c because of the insulating member 23 is disposed therebetween. The insulating member 23 is therefore configured, as shown in FIG. 3, as being thinned towards the center portion thereof so as not to be pressurized by expansion of the cells 5. This is successful in reconciling the release from pressurization by the cell expansion and establishment of a reliable insulation between the cells 5. The strength as a structural body is secured by supporting the cells 5 at the peripheral portions thereof with the protruded portion 21 in contact with the cells 5, while keeping them as being spaced from each other by a predetermined gap, by way of precaution against expansion of the cells 5, by thinning the center portion of the insulating member.

The partition member 2 is also provided with another alignment mechanism. The cells 5 are aligned with the aid of the inner walls of the partition member 2 and a partition of the protruded portion 21. The inserted cells 5 are housed into the partition member 2 in a manner stabilized by the projections 22.

Figure 4:
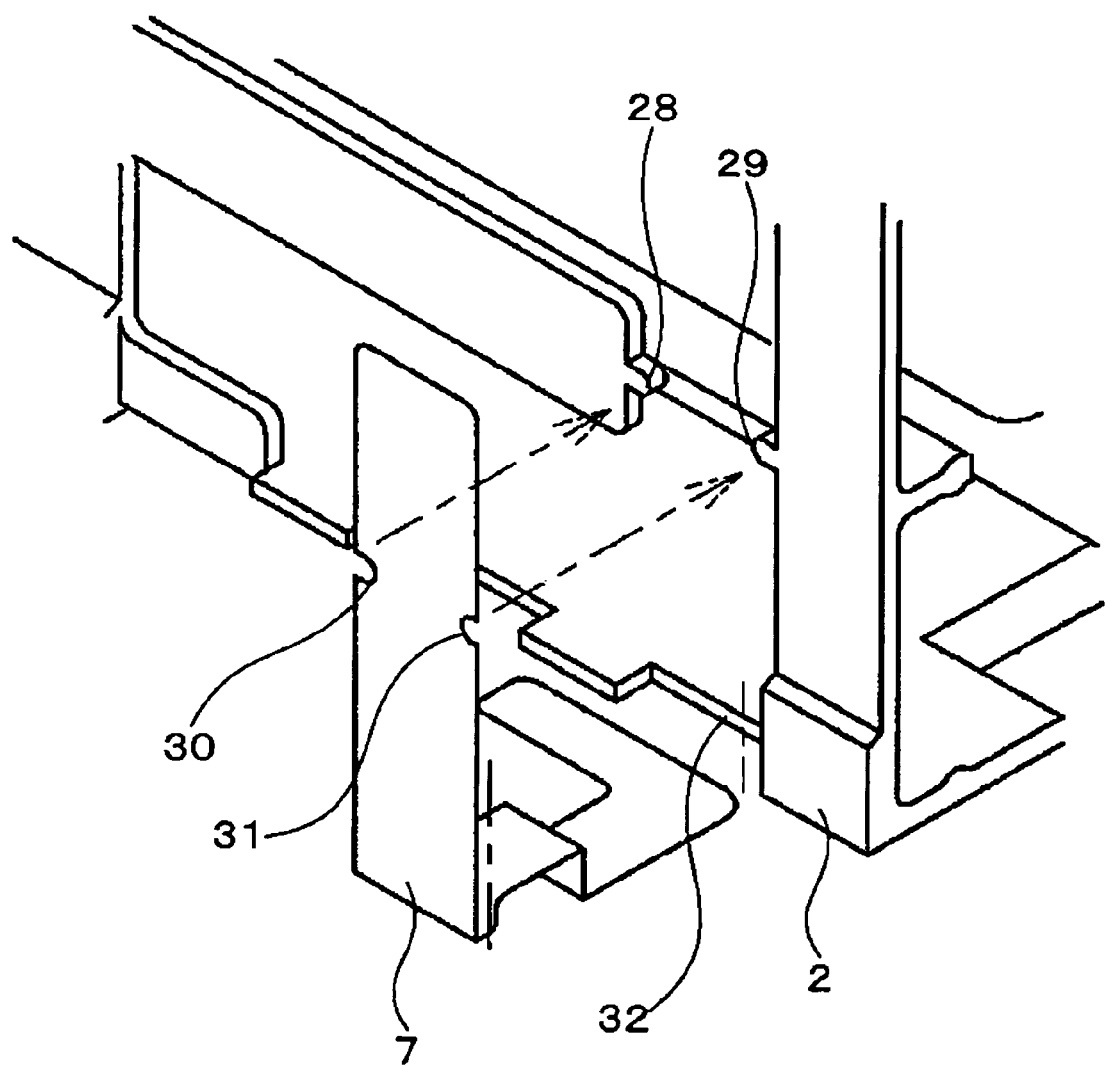
FIG. 4 is a schematic diagram explaining alignment of a tab.

Guides 28 and 29 have a protruded portion used for aligning the negative electrode tab 7. FIG. 4 is an enlarged view of the peripheral portion of the guides 28 and 29. The guides 28 and 29 have a protruded portion which can be engaged with recesses 30 and 31 provided to the negative electrode tab 7, and are provided so that the engagement of these allows fixation of the negative electrode tab 7 to a predetermined position to thereby align the negative electrode tab 7. The guides 28 and 29 are formed typically by using the side walls of the partition member 2 to which the negative electrode tab 7 is attached. The partition member 2 is attached, not only with the negative electrode tab 7, but also with the alignment mechanism for the positive electrode tab 6 and intermediate tab 8, in a similar way. It is preferable herein to align these tabs by providing recesses to the side walls of the partition member 2 so as to correspond with shape of the tabs, and to configure them so as to produce no level difference between the partition member 2 and outer wall surfaces of the tabs incorporated thereto. In an exemplary case shown in FIG. 4, the negative electrode tab 7 is fixed to a predetermined position with the aid of a recessed portion 32 of the partition member 2, so as to align the side faces of the negative electrode tab 7.

Similarly to the alignment of the tabs, the partition member 2 is also provided with alignment mechanisms such as recesses adopted to shapes of other components constituting the battery pack 1 such as the protective element 11a to 11d, and insulating plates 13a and 13b, to thereby improve assembly strength of the individual components and facilitate the assembly operation.

Guides 33 and 34 shown in FIG. 2 have a protruded portion useful for alignment of the upper case 3. The guides 33 and 34 have a protruded portion which can be engaged with recesses provided to the inner surface of the upper case 3, and are provided so as to allow alignment of the upper case 3. The guide 33 and 34 are formed typically by using the side walls of the partition member 2 to be brought into contact with the upper case 3. The protruded portion of the guides 33 and 34 brought into contact with the upper case 3 successfully prevents unsteadiness between the case and partition member 2.

As described in the above, the partition member 2 is provided with the alignment mechanisms not only for the upper case 3 but also for the lower case 4. The partition member 2 is therefore provided with the alignment mechanisms for the case. The battery pack is configured so that the case is supported on the inner side thereof by the partition member 2, and this contributes to improvement in the strength of the battery pack 1. More specifically, strength of the battery pack 1 is improved by providing the alignment mechanism such as the protruded portion to the partition member 2 at the portion thereof brought into contact with the cases, so that the alignment mechanism can be pressed between the upper case 3 and lower case 4 when these cases are fixed to the partition member 2.

As has been described in the above, the battery pack 1 according to one embodiment of the present invention is successful in preventing short-circuiting of the cells 5 because the insulating member 23 is disposed between the cells 5 having different polarity (between the cell 5b and cell 5c). Provision of the insulating member 23 as a part of the partition member 2 needs no additional insulating components.

Because the cells 5a to 5d, inserted and engaged in a stacked manner, are supported on the peripheral portions thereof with the aid of the inner wall of the partition member 2 and protruded portion 21 without unsteadiness, it is made possible to stack the individual cells 5 in a floated manner without using an insulating tape or the like, and to raise the strength as a structural body.

Because the partition member 2 is provided with the openings such as the openings 24 to 27 coping with expansion of the cells 5, as the clearance structures for the expansion of the box-shaped cells, and because the insulating member 23 is thinned towards the center portion thereof, the appearance of the battery pack 1 is successfully prevented from deforming even when the cells 5 expand. The partition member 2 is not pressurized if the cells 5 expand, and this improves the safeness and reliability of the battery pack 1. The insulating member 23 contributes to improvement in the strength of the partition member 2.

Because the major components such as the cells 5, tabs, circuit board 9 and cases are aligned by the partition member 2, the battery pack is favorable in positional accuracy of the individual components, and in readiness in the assembly. Also the strength as a structural body is improved. The partition member 2 can be packed together with the upper case 3 and lower case 4 without unsteadiness, and this improves the impact strength against dropping or the like, that is strength against external load.

The present invention is by no means limited to the above-described embodiments of the invention, and allows various modifications and applications without departing from the spirit of the invention. For example, the box-shaped cell 5 is not limited to the lithium ion battery exemplified in one embodiment in the above, but may be lithiumpolymerbattery, nickel hydrogen (Ni—MH) battery, nickel cadmium (Ni—Cd) battery and lithium metal battery and so forth, having a stacked surface.

The number of cells 5 housed in the battery pack is not limited to four (cells 5a to 5d), but may be one or more corresponded to the number of the cells 5, typically two, three and six as long as the partition member 2 is configured in accordance with the number of the cells. It is also allowable to incorporate four or less cells 5 into the battery pack 1 in the above-described embodiment. Mode of connection of the cells 5 is not limited to 2P2S (two-in-parallel and two-in-series), but may any other combination such as all-series, all-parallel, three-in-parallel and one-in-series, and one-in-parallel and three-in-series. The cells 5 may be configured not only by vertical stacking, but also may be lateral stacking, combination of vertical stacking and lateral stacking, and multiple stacking.

The above-described battery pack 1 has the opening provided to the side walls of the partition member 2 so as to cope with expansion of the cells 5, but it is also allowable, in place of providing the openings, to configure the surfaces, which are brought into contact with the side faces of the cells 5, so as to be thinned towards the center portion.

What is claimed is:

1. A battery pack having a plurality of box-shaped cells housed in a case, comprising:
    an electrode tab configured to electrically connect the cells to an external device, the electrode tab including an alignment recess;
    a partition member supporting said plurality of box-shaped cells in a stacked manner as being spaced from each other, said partition member being configured to support said cells at the peripheral portions of said cells, the partition member including a guide configured to mate with the alignment recess of the electrode tab to fix the electrode tab with respect to the partition member; and
    an insulating member insulating between said cells, which are electrically connected in parallel, is located in an aperture in said partition member, the partition member having on inner side walls thereof, protruded portions corresponding to a thickness of the cells for maintaining the cells therebetween, and the insulating member having a surface, with which a side face of said cells contact, having a smaller thickness in a center portion thereof then an edge portion.

2. The battery pack according to claim 1, wherein said partition member is configured to support said cells at the peripheral portions of said cells, and has an opening in a surface thereof contacting with a side face of said cells.

3. The battery pack according to claim 1, wherein said partition member has an alignment mechanism for said cells.

4. The battery pack according to claim 1, wherein said partition member has an alignment mechanism for a tab used for electrical connection of said cells.

5. The battery pack according to claim 1, further comprising a circuit board having a protective circuit mounted thereon;
    wherein said partition member has an alignment mechanism for said circuit board.

6. The battery pack according to claim 1, wherein said partition member has an alignment mechanism for said case, and is configured to support the inner side of said case.

7. The battery pack according to claim 1, wherein said insulating member is integrally molded in the aperture in said partition member.

8. The battery pack according to claim 1, wherein said electrode tab including include two alignment recesses that each receive a separate guide of the partition member.

9. The battery pack according to claim 8, wherein said two alignment recesses are on opposite sides of the electrode tab from each other.

10. The battery pack according to claim 1, further comprising:
    a second electrode tab configured to electrically connect the cells to an external device, the second electrode tab including an alignment recess, and
    the partition member further includes a second guide configured to mate with the alignment recess of the second electrode tab to fix the second electrode tab with respect to the partition member.

11. The battery pack according to claim 10, further comprising:
    an intermediate tab configured to electrically connect a positive electrode of one of the cells to a negative electrode to another of the cells, the intermediate tab including an alignment recess, and
    the partition member further includes a third guide configured to mate with the alignment recess of the intermediate tab to fix the intermediate tab with respect to the partition member.

* * * * *